Figure 1:
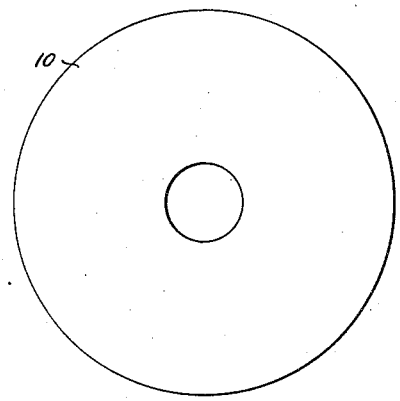

Nov. 24, 1942.     D. RAU ET AL     2,303,231

DRY RECTIFIER

Filed Dec. 4, 1939

INVENTOR:
DAVID RAU & CARL E. PETERS
BY
Roy M. Eilers
ATTORNEYS.

Patented Nov. 24, 1942

2,303,231

UNITED STATES PATENT OFFICE

2,303,231

DRY RECTIFIER

David Rau, Kirkwood, and Carl E. Peters, St. Louis, Mo., assignors to B. L. Electric Company, a corporation of Missouri Application December 4, 1939, Serial No. 307,428

10 Claims. (Cl. 175—366)

This invention relates to improvements in the manufacture of dry rectifiers. More particularly the invention relates to improvements in the preparation of electropositive elements used in the manufacture of dry rectifiers. It is an object of the present invention to provide a method of preparing the surface of electropositive elements for dry rectifiers in such a way that a uniform and lasting rectifying surface will be secured between electropositive and electronegative elements when they are fused together.

Dry rectifiers have been made for some time by the fusion of an electropositive and an electronegative element. When fused together the two elements have a surface between them which has rectifying properties. The efficiency of the surface between the electropositive and the electronegative elements can be increased by preparing a surface on the electropositive element. This prepared surface not only increases the efficiency of the rectifying surface between the elements, but makes the bond between the elements more intimate.

The method by which a surface is now prepared consists of the immersion of an electropositive element in a solution of metallic salts and the resultant precipitation of a coating of metal on the electropositive element. The coating thus obtained is a poor conductor of electricity and resists the flow of electricity through an electropositive and an electronegative element when the surface is placed between the two. When a strong current is made to flow from the electropositive to the electronegative element, the resistance of the prepared surface to the flow of current creates an intense heat between the elements. During the fusing operation the elements are held together by pressure, and the heat cooperates with the pressure to fuse the elements together. The fusing operation creates a fused surface between the two elements which has current-rectifying properties.

There are several objections to this process; one is that great care must be exercised during the operation of the precipitation process because it is a critical one, and another is the fact that the composition of the coating obtained is limited by reason of the electromotive series of metals and the nature of the chemical process involved. The precipitation of material on an electropositive element by immersion in a solution of a metallic salt is a critical one in which the thickness of the coating is dependent upon the time of immersion, the temperature of the solution, the strength of the solution, and many other factors. The multiplicity of factors in the process make it uncertain, expensive, and ill-suited to continuous and uniform production. The disadvantages detailed above are obviated by the process contemplated by the invention. This process permits the electrolytic preparation of a surface on electropositive elements to be used in the manufacture of dry rectifiers. By use of electrolysis, suitable surfaces can be deposited on rectifier elements and can be manufactured by production-line methods. It is, therefore, an object of the present invention to provide means to electrolytically prepare surfaces on electropositive elements for rectifiers.

This invention describes a method of preparing an electropositive element for fusion with an electronegative element by etching the surface of the electropositive element. The etching of such an electropositive element has been found to produce a number of minute projections on the surface of the element. These minute points cause an intense heat to be generated between the surfaces of the electropositive and electronegative surfaces when a current is passed between the elements, since the current is concentrated at a number of points which have a small cross section. The small cross section of the projections and the heavy current density flowing through the projections make the projections quite hot and fuse the material around them. The etching alone, therefore, will give the effect which is now obtained by the use of precipitated coatings which are deposited by chemical action. It is possible, however, by combining the etching of the metal and the precipitation of a suitable material on the metal to obtain a new and better rectifier in that a suitable material is placed between the electropositive and electronegative elements and an intense heat is provided at that point to fuse the surfaces together. It is an object of the present invention to provide an etched surface on an electropositive element, to put a suitable material between an electropositive and an electronegative element, and to fuse the two elements together.

Further objects and advantages of the invention will be shown and described in the following detailed description and accompanying drawing. The invention is shown and described in the drawing and accompanying description in a preferred form, but it is to be understood that the description and drawing do not limit the invention, and that the invention will be defined by the accompanying claims.

Figure 2:
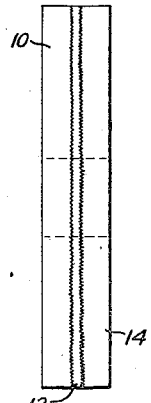

In the accompanying drawing, Fig. 1 shows an assembled rectifying couple and Fig. 2 shows a cross section of such a couple.

In Fig. 2 the electropositive element is represented by 10. 12 is the rectifying surface between the discs, and 14 is the electronegative disc.

In making a rectifier, any suitable electropositive element may be used; like magnesium, aluminum, beryllium or alloys of these metals. In describing the invention, a typical electropositive element, magnesium, and a typical electronegative element, copper sulfide, will be used, but it is understood that this is for purposes of illustration only, since any other suitable materials may be used. One side of the electropositive element 10 may be treated to remove any oxide, grease, or other film which would prevent electrical contact between the element and the solution in which it is placed. The treatment of the element to remove the grease or oxide may consist of polishing with dry pumice, fine sandpaper, a steel scratch brush, or similar means. The element is then immersed in a solution and is made the anode, while the cathode is made of a non-corrosive material such as stainless steel. The cathode and anode are then connected to a suitable source of current.

The selection of the proper solution can be made to determine the nature of the surface on the magnesium. The film which will be deposited on the magnesium may be made as thick or as thin as desired, by regulating the concentration of the solution, the amount of current flowing through the solution, the character of the solute, and the time during which the operation is continued. We have found that a satisfactory concentration of the solution is about one pound of solute to one gallon of solvent. The current density may vary from ten to a hundred or more amperes for each square foot of the magnesium being treated, but current densities of from fifty to seventy amperes for each square foot of surface to be treated have usually been found satisfactory. With currents from ten to a hundred or more amperes, the electrolytic action may be continued from two to twenty or more seconds, although the usual time is from seven to ten seconds. After the electrolytic process, the magnesium may be removed from the solution, washed in water, and then dried by passage through squeegee rollers and subsequent treatment with alcohol or heat in an oven.

By use of the process outlined in the invention, the surface of the magnesium may be etched to form a number of minute projections thereon. These minute projections are the only contact between the magnesium and copper sulfide elements during the fusing operation, and since the current is concentrated at these minute points, an intense heat is created around them during the fusing process. A magnesium element with an etched surface is the equivalent of a magnesium element with a coating of minute particles of metal precipitated upon it, since both surfaces are resistant to the fusing current and both create an intense heat between the magnesium and copper sulfide elements during the fusing process. Such a surface may be secured electrolytically by making the magnesium element the anode in a solution of an ammonium salt. An etched surface also may be obtained by treatment of the magnesium with an acid, but such a process is not as accurate or exact as the one with which the invention is chiefly concerned. In the electrolysis process, the magnesium which is removed from the surface of the anode combines with oxygen and hydroxl ions around it to form magnesium oxide and magnesium hydroxide. Some of the oxide and hydroxide remains on the surface of the anode and some of it breaks away from the anode and settles in the container as a white flocculent precipitate. Where the electrolyte is an ammonium salt, the magnesium hydroxide will be dissolved. The chemical reaction which causes the hydroxide to dissolve is shown by the following chemical equation:

$$Mg(OH)_2 + 2NH_4Cl \rightarrow MgCl_2 + 2NH_3 + 2H_2O$$

By varying the strength of the solution of the ammonium salt, the thickness of the deposit of magnesium hydroxide may be determined. Where a very concentrated solution of an ammonium salt is used as the electrolyte, very little magnesium hydroxide is left undissolved on the magesium, and an etched surface free of deposit is secured. The amount of magnesium hydroxide deposited on the electropositive element may be increased by use of a solution which fosters oxidation at the anode. Such a solution is a nitrate of sodium or other metal. When this electrolyte is used, a uniform deposit of magnesium hydroxide is secured on the magnesium, while very little etching effect is noticed on the magnesium. From this it can be seen that, by a proper selection of the electrolyte, the surface of the electropositive element may be made to fit any desired specifications. A cheap electrolyte is a sodium chloride solution, and this will give a surface with a moderate deposit on the magnesium and also a moderate etching effect on the magnesium.

Where a manganese alloy of magnesium is used instead of a pure magnesium element, the same range of surfaces is possible. Where an ammonium salt is used as the electrolyte, the surface of the alloy becomes etched. If the solution of the ammonium salt is more concentrated, the manganese is not affected while the magnesium goes into solution. The result is an etched surface with deposits of manganese on the magnesium. By use of salts of sodium and similar metals, a coating of magnesium hydroxide and manganese oxide or hydroxide is secured in combination with an etched surface on the alloy. Where a nitrate is used as the electrolyte, little etching action is obtained while a uniform deposit of the oxides and hydroxides of magnesium and manganese is secured.

Therefore, it can be seen that by proper selection of the electropositive element, of the electrolyte, of the concentration of the electrolyte, of the current density, and the proper timing of the operation, the surface of an electropositive element may be made to conform to any desired specifications.

In the above description, the electrolytic action was caused by use of direct current, but alternating current may be used as well. Alternating current voltages from six to twelve volts have been found suitable where the current densities are within the same ranges used with direct current. The same electrolytes used for direct current electrolysis may be used with alternating current. The action of the alternating current may be explained by saying that the current activates a natural tendency to attack magnesium or magnesium alloys, which many of these salts possess. It also may be ascribed to a small amount of self-rectification which occurs in the solution.

We have found that by using an electrolytic process in preparing an electropositive element for fusion with an electronegative element, we obtain a more uniform result than is possible by use of the present chemical process. The coating on the magnesium and the etching effect on the magnesium may be closely regulated and accurately maintained by the electrolytic process. This process is well suited to automatic or semiautomatic production methods since the process can be so closely controlled by the regulation of the current flowing through the solution. The process is especially valuable in that the surface of the electropositive element may be greatly varied to fit the specifications of each rectifier.

Whereas we have shown and described a preferred embodiment of our invention, it is obvious to those skilled in the art that various changes and alternations may be made in the process without altering the scope of the invention.

It can be seen that by use of the invention, a process possessing great versatility is provided to prepare the surfaces of electropositive elements for the fusing process in making dry rectifiers.

What we claim is:

1. A rectifier comprising an electropositive element having an etched surface thereon, an electronegative element so positioned with respect to the electropositive element that said electropositive and electronegative elements are oppositely disposed relative to the etched surface on the electropositive element, and an electrothermally prepared rectifying surface between the electropositive and electronegative elements.

2. A rectifier comprising an electropositive element having an etched surface and an electrolytically formed compound of the electropositive element on the surface thereof, an electronegative element so positioned with respect to the electropositive element that said electropositive and electronegative elements are oppositely disposed relative to the etched surface and electrolytically formed compound of the electropositive element on said surface, and an electrothermally prepared surface between the electropositive and electronegative elements.

3. The process of making electrical rectifiers which comprises etching the surface of an electropositive element, placing such etched surface in contact with an electronegative element, and passing a current through the elements to fuse the elements together.

4. The process of making electrical rectifiers which comprises forming a compound of an electropositive element on the surface of such element by electrolytic action, etching the surface of the electropositive element, placing an electronegative element in contact with the surface of the electropositive element, and passing a current through the elements to fuse the elements together.

5. A rectifier comprising an electropositive element having an electrolytically formed etched surface thereon, an electronegative element so positioned with respect to the electropositive element that said electropositive and electronegative elements are oppositely disposed relative to the electrolytically formed etched surface on the electropositive element, and an electrothermally prepared surface between the said elements.

6. A rectifier comprising an electropositive element having an electrolytically formed etched surface thereon, an electronegative element so positioned with respect to the electropositive element that said electropositive and electronegative elements are oppositely disposed relative to the electrolytically formed etched surface on the electropositive element, and an electrothermally prepared rectifying surface between the electropositive and electronegative elements.

7. The process of making electrical rectifiers, which comprises etching the surface of an electropositive element by electrolysis, placing such etched surface in contact with an electronegative element, and passing a current through the elements to permanently fuse them together.

8. The process of making electrical rectifiers, which comprises etching the surface of an electropositive element by electrolysis, placing such etched surface in contact with an electronegative element, and electrothermally fusing the electropositive and electronegative elements together.

9. An electropositive element, to be used in making a dry rectifier, that comprises a piece of metal having an etched surface thereon, said etched surface consisting of a multiplicity of minute projections that provide a high surface contact resistance for the said electropositive element, said etched surface being an integral part of the said piece of metal and being adapted to directly engage an electronegative element.

10. An electropositive element, to be used in making a dry rectifier, that comprises a piece of metal having an electrolytically prepared etched surface thereon, said etched surface consisting of a multiplicity of minute projections that provide a high surface contact resistance for the said electropositive element, said etched surface being an integral part of the said piece of metal and being adapted to directly engage an electronegative element.

DAVID RAU.
CARL E. PETERS.